US012490952B2

(12) United States Patent
Al Harbi et al.

(10) Patent No.: US 12,490,952 B2
(45) Date of Patent: Dec. 9, 2025

(54) COMBINED SUB-ILIOPSOAS AND SUBPECTINEAL BLOCKS—FOR HIP SURGERY

(71) Applicants: National Guard Health Affairs, Riyadh (SA); King Saud bin Abdulaziz University for Health Sciences, Riyadh (SA); King Abdullah International Medical Research Center, Riyadh (SA)

(72) Inventors: Mohammed Al Harbi, Riyadh (SA); Rahul Guru, Riyadh (SA); Sheelaj Sharma, Riyadh (SA); Khaled Al Attas, Riyadh (SA)

(73) Assignees: National Guard Health Affairs, Riyadh (SA); King Saud bin Abdulaziz University for Health Sciences, Riyadh (SA); King Abdullah International Medical Research Center, Riyadh (SA)

( * ) Notice: Subject to any disclaimer, the term of this patent is extended or adjusted under 35 U.S.C. 154(b) by 1546 days.

(21) Appl. No.: 16/930,810

(22) Filed: Jul. 16, 2020

(65) Prior Publication Data

US 2022/0015738 A1    Jan. 20, 2022

(51) Int. Cl.
*A61B 8/00* (2006.01)
*A61B 8/08* (2006.01)
(Continued)

(52) U.S. Cl.
CPC ............ *A61B 8/085* (2013.01); *A61B 8/4494* (2013.01); *A61K 31/485* (2013.01); *A61M 19/00* (2013.01);
(Continued)

(58) Field of Classification Search
CPC ..... A61B 8/0841; A61B 8/085; A61B 8/4455; A61B 8/4494; A61B 8/469; A61M 19/00; A61M 25/01; A61K 31/485; A61P 23/02
See application file for complete search history.

(56) References Cited

U.S. PATENT DOCUMENTS

| | | |
|---|---|---|
| 2003/0152637 A1 | 8/2003 | Chasin et al. |
| 2006/0079558 A1 | 4/2006 | Aberg et al. |

(Continued)

FOREIGN PATENT DOCUMENTS

WO PCT/2005/02648/DEL    4/2007

OTHER PUBLICATIONS

Nielsen, et al. ; A Cadaveric Study of Ultrasound-Guided Subpectineal Injectate Spread Around the Obturator Nerve and Its Hip Articular Branches ; Regional Anesthesia and Pain Medicine ; vol. 42, No. 3 ; May-Jun. 2017 ; 5 Pages.

(Continued)

*Primary Examiner* — Kevin C Sirmons
*Assistant Examiner* — William R Frehe
(74) *Attorney, Agent, or Firm* — Oblon, McClelland, Maier & Neustadt, L.L.P.

(57) ABSTRACT

A method for applying a regional block of the articular sensory branch of femoral (FN), obturator (ON) and accessory obturator nerves (AON) comprising injection of an anesthetic at a single needle entry point into a these nerves anatomical sites. Another aspect of this technology is a kit for performing this method.

17 Claims, 9 Drawing Sheets

(51) Int. Cl.
    *A61K 31/485*     (2006.01)
    *A61M 19/00*     (2006.01)
    *A61M 25/01*     (2006.01)
    *A61P 23/02*     (2006.01)
    *G01S 15/89*     (2006.01)

(52) U.S. Cl.
    CPC ............. *A61M 25/01* (2013.01); *A61P 23/02* (2018.01); *G01S 15/892* (2013.01); *A61B 8/0841* (2013.01)

(56) References Cited

U.S. PATENT DOCUMENTS

| | | | |
|---|---|---|---|
| 2019/0070115 A1 | 3/2019 | Rwei et al. | |
| 2020/0178927 A1* | 6/2020 | Patton | A61B 5/7267 |
| 2020/0397399 A1* | 12/2020 | Adams | A61B 8/5253 |

OTHER PUBLICATIONS

Lee, et al. ; Ultrasound guided obturator nerve block: a single interfascial injection technique ; Journal of Anesthesia ; vol. 25m, Issue 6 ; pp. 923-926 ; Dec. 2011 ; Abstract Only ; 5 Pages.

Prakash, et al. ; Ultrasonography-Guided Articular Branch of Femoral Nerve and Anterior Obturator Nerve Block for Perioperative Pain in Hip Surgery ; Indian Journal of Pain ; 2018 ; 4 Pages.

McNamee, et al. ; Post-operative analgesia following total knee replacement: an evaluation of the addition of an obturator nerve block to combined femoral and sciatic nerve block ; Acta Anaesthesiologica Scandinavica ; vol. 46, Issue 1 ; Abstract Only; Mar. 19, 2002 ; 2 Pages.

Ilfeld, et al. ; Prepuncture Ultrasound Imaging to Predict Transverse Process and Lumbar Plexus Depth for Psoas Compartment Block and Perineural Catheter Insertion: A Prospective, Observational Study ; International Anesthesia Research Society, vol. 110, No. 6 ; Jun. 2010 ; 4 Pages.

Sarkar, et al. Lumbar plxeus block: Safe anesthesia for hip surgery ; Nov. 8, 2019 ; 3 Pages.

\* cited by examiner

COMBINED SUB-ILIOPSOAS AND SUBPECTINEAL BLOCKS—FOR HIP SURGERY

BACKGROUND OF THE INVENTION

Field of the Invention

The invention falls within the field of medicine, more specifically in the field of regional anesthesia and surgery.

Description of Related Art

Total hip replacement (total hip arthroplasty) involves total replacement of a hip joint and is most commonly used for pain relief and improvement in hip function and to treat joint failure caused by osteoarthritis, rheumatoid arthritis, avascular necrosis, traumatic arthritis, protrusion acetabuli, certain hip fractures, benign and malignant bone tumors, arthritis associated with Paget's disease, ankylosing spondylitis and juvenile rheumatoid arthritis. Partial hip replacement (partial hip arthroplasty) involves the removal and replacement of the ball of the hip joint and does not replace the socket. These surgeries are most often done to repair certain types of hip fractures. However hip replacement surgeries are usually considered only after other therapies, such as physical therapy and pain medications, have failed.

"Nerve block" or regional nerve blockade is a deliberate interruption of signals traveling along a nerve, often for the purpose of pain relief; it usually lasts hours or days and involves the injection of an anesthetic and another agent or agents onto or near a nerve. There are different kinds of nerve blocks used for various purposes. These include therapeutic nerve blocks to treat painful conditions; diagnostic (deferential) nerve blocks to determine sources of pain; prognostic nerve blocks to predict the outcomes of given treatments and determine if more permanent treatments (such as surgery) would be successful in treating pain and pre-emptive nerve blocks which are meant to prevent subsequent pain from a procedure that can cause problems including phantom limb pain. Usually two injections of local anesthetic are made via a single needle entry point provide a superior nerve blocking effects and to permit the dosage of local anesthetic to be reduced by at least 5-50% compared to conventional injections through multiple needle entry points.

Opiates and non-steroidal anti-inflammatory drugs (NSAID) are medications frequently used for intra and post-operative surgical pain control or to reduce tissue inflammation, however these drugs are associated with adverse side effects which affect patient and hospitalization outcome especially in elderly populations. Therefore, regional anesthesia and nerve blocks are frequently used to decrease reliance on these drugs and their shortcomings and side-effects.

The term "local anesthetic" ("LA") means a drug which provides local numbness or pain relief. Local anesthetics are broken down into two categories: ester-linked and amide-linked. The ester-linked LAs include benzocaine, procaine, tetracaine, and chloroprocaine. The amide-linked LAs include lidocaine, mepivacaine, prilocaine, bupivacaine, ropivacaine, and levobupivacaine. Chloroprocaine is a short-acting drug (45-90 minutes), lidocaine and mepivacaine are intermediate duration (90-180 minutes), and bupivacaine, levobupivacaine, and ropivacaine are long-acting (4-18 hours).

Drugs commonly used for peripheral nerve blocks include lidocaine, ropivacaine and bupivacaine. These drugs are often combined with adjuvants (additives) with the end goal of increasing the duration of the analgesia or shortening time of onset. Additives may include epinephrine, clonidine, and dexmedetomidine. Vasoconstriction caused by a local anesthetic may be further enhanced synergistically with the addition of epinephrine, the most widely used additive. Epinephrine increases the length of analgesic duration and decreases blood flow by acting as an agonist at the $\alpha 1$-adrenoceptor. Dexmedetomidine is another additive which is not as widely used as epinephrine. Studies in humans indicate improved onset time and increased duration of analgesia.

An anesthetic may be applied in the form of an acid or hydrochloride salt or as a free base. Also, an anesthetic can be selected to produce a modality-specific blockade, as reported by Schneider, et al., Anesthesiology, 74: 270-281 (1991) or to provide for sustained release as reported by Masters, et al., Soc. Neurosci. Abstr., 18:200 (1992), the teachings of both of which are incorporated herein.

To date, surgical hip pain such as that involving the obturator nerve remains a significant issue despite optimal treatment with currently available regional anesthesia and nerve blocks.

Post-operative hip pain is often relayed via the nerves supplying the anterior hip capsule (femoral, obturator and accessory obturator nerves).

Femoral Nerve (FN) is the largest branch of the lumbar plexus and provides innervation to the quadriceps muscles and hip joint, thigh and medial aspect of the leg and foot; It originate from the posterior divisions of the second, third, and fourth lumbar nerves (L2-L4).

Obturator Nerve (ON), which arises from the ventral divisions of the same lumbar plexus nerves (L2-L4) and often innervates a portion of the hip joint, most of the adductor muscles, a variable portion of the medial aspect of the femur, and has variable skin distribution on the medial aspect of the thigh, its third branch is the largest, while that from the second is often very small, clinically this nerve sometime will be blocked for evaluation and management of hip joint pain and spasm of the hip adductors; Obturator nerve block is one of the most challenging regional anesthesia techniques; the characteristics of this nerve have been described using ultrasound (US) in the available literatures but till date no published paper about blocking this nerve for hip surgeries specifically.

The Accessory Obturator Nerve (AON) is an accessory nerve of small size in the lumbar region which arises from the ventral divisions of the third and fourth lumbar nerves (L3-L4), it present in 8-30% of patients, It descends along the medial border of the psoas major, crosses the superior ramus of the pubis, and passes under the pectineus, where it divides into numerous branches. One of these supplies the pectineus, penetrating its deep surface; another is distributed to the hip-joint; while a third communicates with the anterior branch of the obturator nerve, it is clinically important and should also be considered during regional anesthesia nerve blockade for hip surgeries.

The iliopsoas muscle refers to the joined psoas and the iliacus muscles which are separate in the abdomen, but usually merge in the thigh. As such, they are usually given the common name iliopsoas. The iliopsoas muscle joins to the femur at the lesser trochanter. It acts as the strongest flexor of the hip. The iliopsoas muscle is supplied by the lumbar spinal nerves L1-3 (psoas) and parts of the femoral nerve (iliacus); see FIG. 1A and FIG. 2A.

At present conventional methods of applying a nerve block for hip surgeries assume that the block primarily affects the femoral nerve with a retrograde spread of local anesthetic (LA) drugs to the obturator nerve, see the two lower circles in FIG. 3. However, the obturator nerve stem before its division into anterior and posterior branches is not specifically targeted and blocked at current clinical practice.

There is a need for a simple method for blocking the ON or both the ON and AON that provides excellent quality of hip analgesia without compromising hemodynamics, respiration or producing a motor block. However to date no clinical evidence is available about direct blockage of all the sensory articular branches supplying the anterior hip capsule with a single block technique.

BRIEF SUMMARY OF THE INVENTION

Our aspect of the invention is to provide ultrasound guided single nerve block technique which will cover all major nerves supplying the anterior hip capsule. i.e. the sensory articular branch of femoral nerve, stem of obturator nerve, and accessory obturator nerve.

Our approach differs from a conventional femoral nerve block used for hip surgery because the anatomical landmarks for needle entry are above the femoral crease and with this single entry block technique, the three major nerves supplying the anterior hip capsule can be blocked and provides an excellent quality of hip analgesia.

BRIEF DESCRIPTION OF THE DRAWINGS

A more complete appreciation of the disclosure and many of the attendant advantages thereof will be readily becomes better understood by reference to the following detailed description when considered in connection with the accompanying drawings figures.

DETAILED DESCRIPTION OF THE INVENTION

Embodiments as disclosed herein include, but are not limited to, invention of a method for ultrasound guided single-entry nerve blocking technique which covers and blocks the entire nerve supply of the hip anterior capsule (sensory articular femoral nerve, accessory obturator nerve and undivided stem of obturator nerve) with local anesthetic drugs. It reliably provides a significant benefit in terms of intra and post-operative pain relief after major hip surgeries and brings the change in clinical practice of anesthesiologists all over the world by providing a positive impact on patient satisfaction and outcome.

This new innovative single entry block technique introduces the use of low frequency curvilinear probe of ultrasound, which provides a broader frame of son anatomy and helps to deploy the local anesthetics injection at the sub iliopsoas (SIP) and sub pectineal (SP) regions which covers the sensory articular branches of the FN, ON and AON with minimal scanning adjustment and single needle entry point. Preferably, the nerve block described herein is an opioid free or opioid sparing SIP/SP nerve block where the dosage and concentration of local anesthetics is well below the permissible safety dose, for example, no more than 10, 20, 30, 40, 50, 60, 70, 80 or 90% of the safe dose of a local anesthetic. Similarly, the method reduces the opiate related adverse effects by reducing the dosage of opioid or opioid-like pain medications to no more than 10, 20, 30, 40, 50, 60, 70, 80 or 90% of a dosage used during or after a conventional nerve block.

Figure 1A:
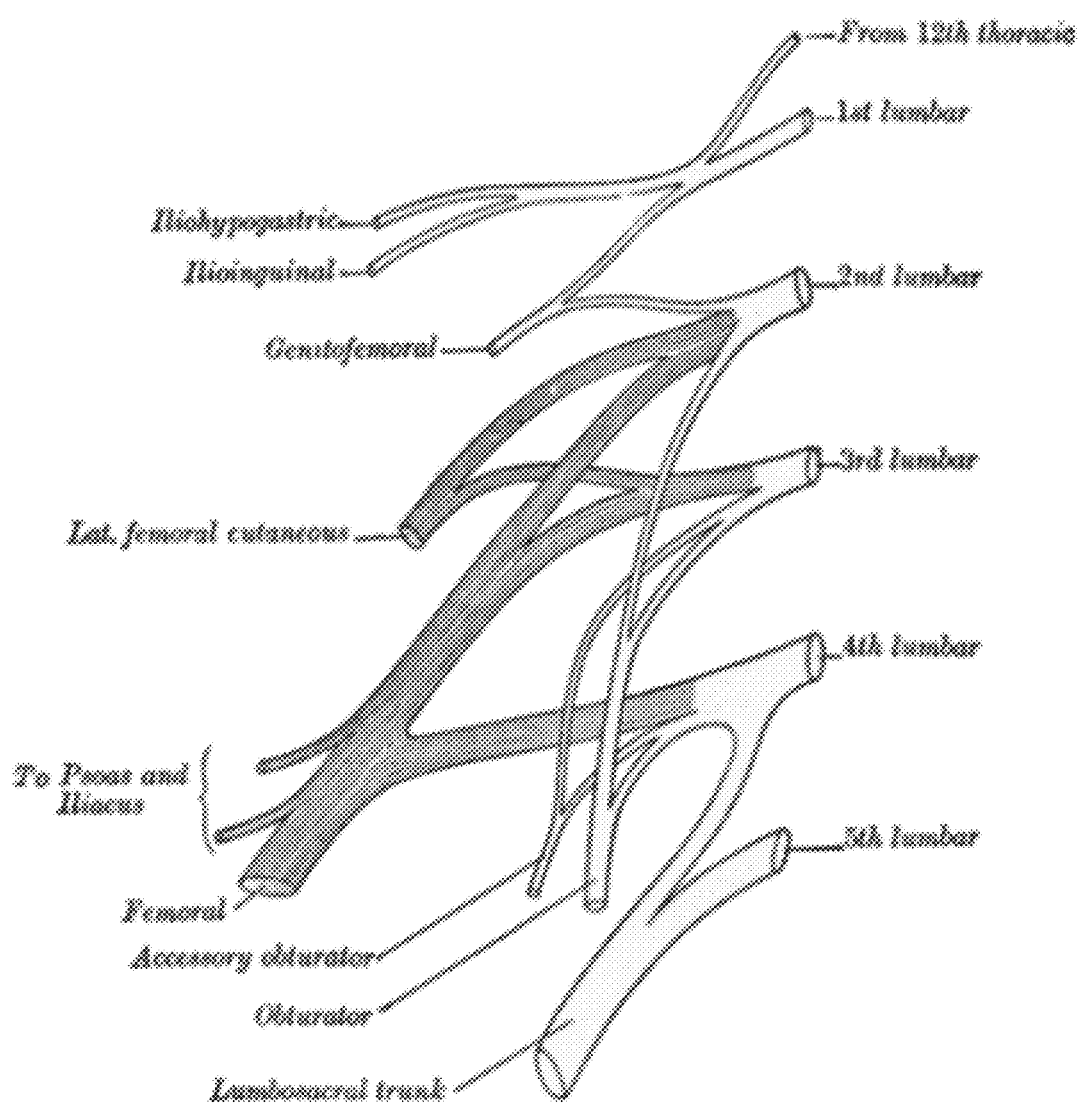
FIG. 1A, 1B. Schematic origins of the femoral, obturator and accessory obturator nerve. The femoral nerve arises from the dorsal divisions of the second, third, and fourth lumbar nerves in the lumbar plexus. The obturator nerve arises from the ventral divisions of the second, third, and fourth lumbar nerves in the lumbar plexus.
Figure 1B:
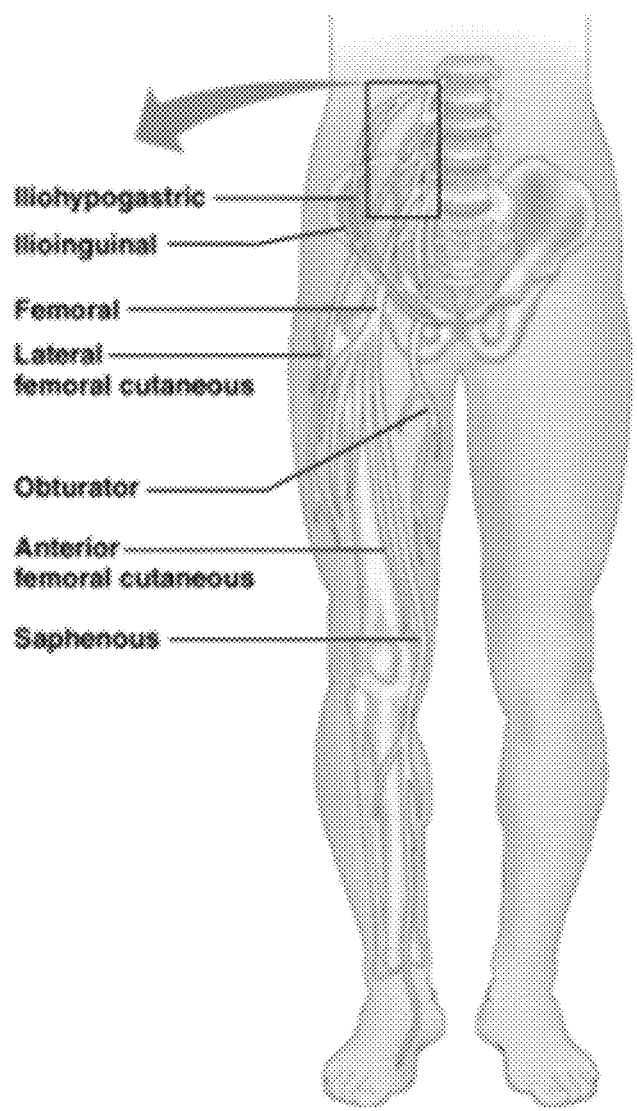
Figure 2A:
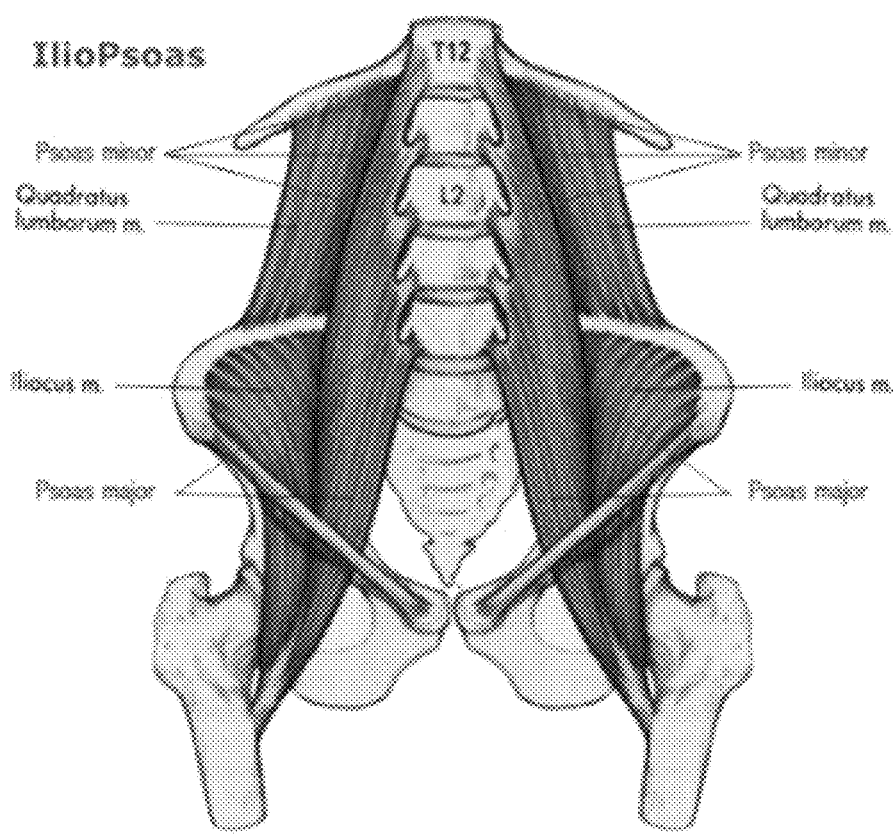
FIG. 2A shows the anatomical position of the iliopsoas or the joined psoas and the iliacus muscles.
Figure 2B:
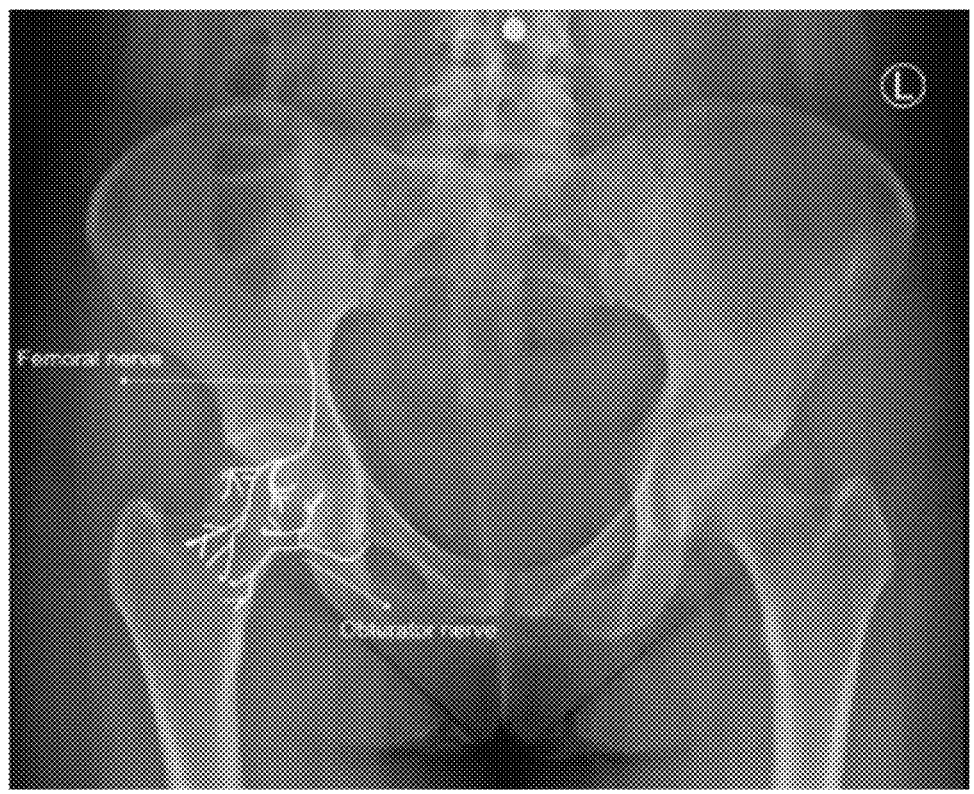
FIG. 2B. Shows a plane X-ray of the hip joint with path of the femoral and the obturator nerves.
Figure 2C:
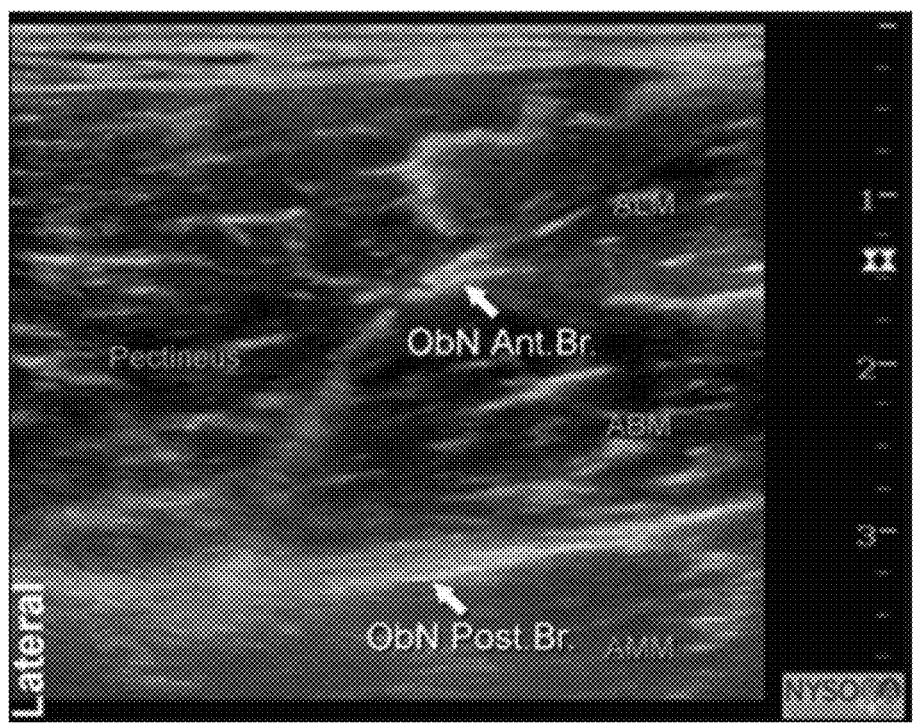
FIG. 2C. Describes a single ultrasound frame showing positions of the anterior and posterior branches of the obturator nerve and related muscular structures
Figure 3:
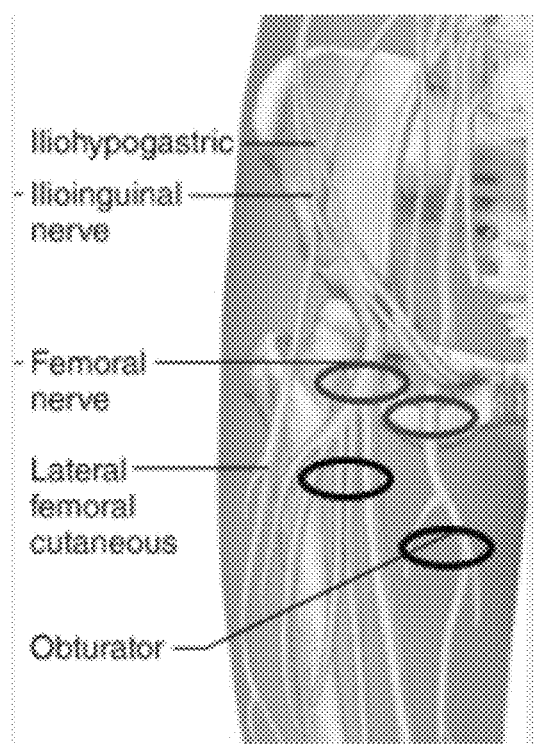
FIG. 3 depicts the conventional sites for application of a femoral and obturator nerve block (lower circles) and the invented sites (upper circles).
Figure 4A:
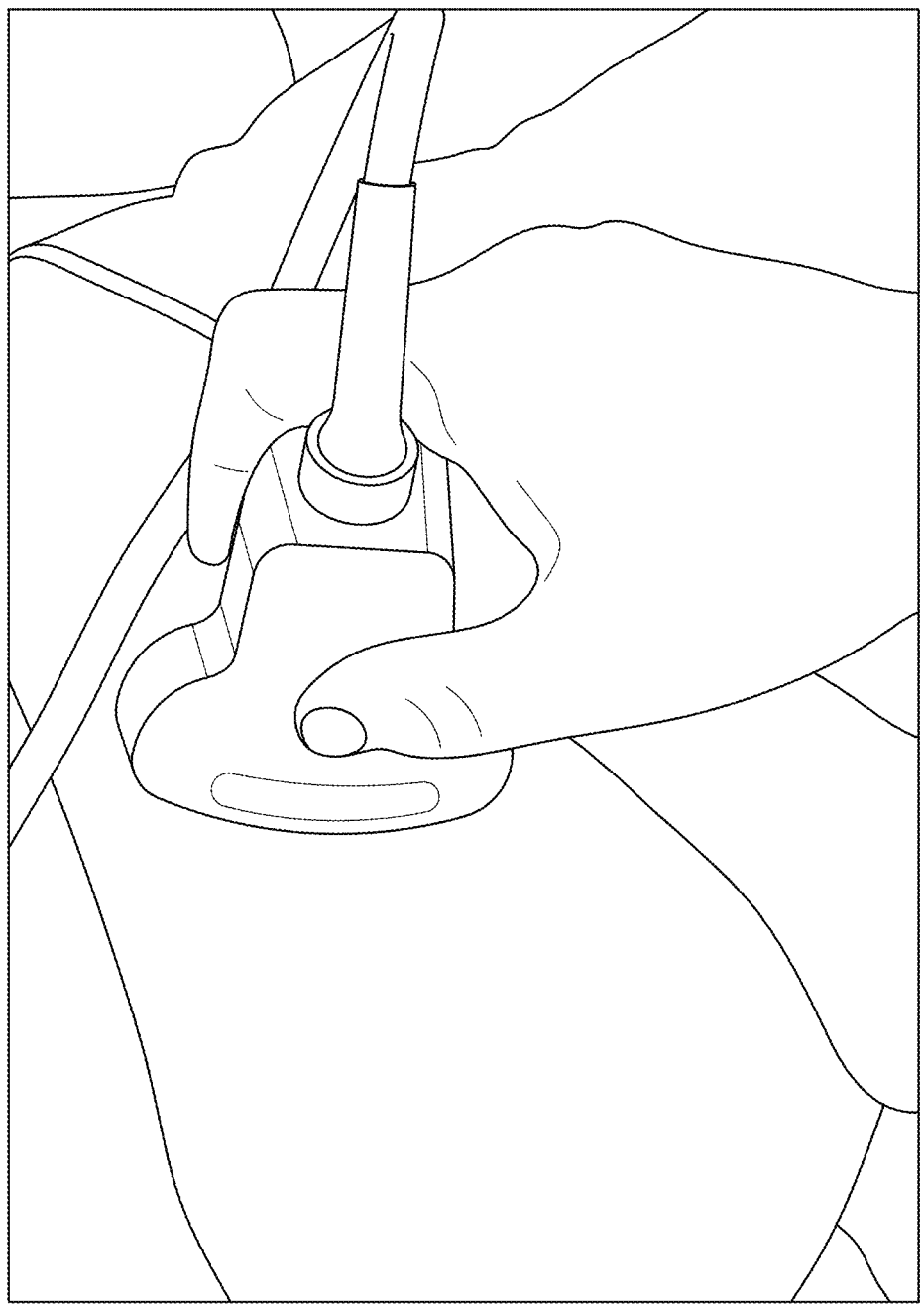
FIG. 4A shows the application of an ultrasonic probe over anatomical landmarks.
Figure 4B:
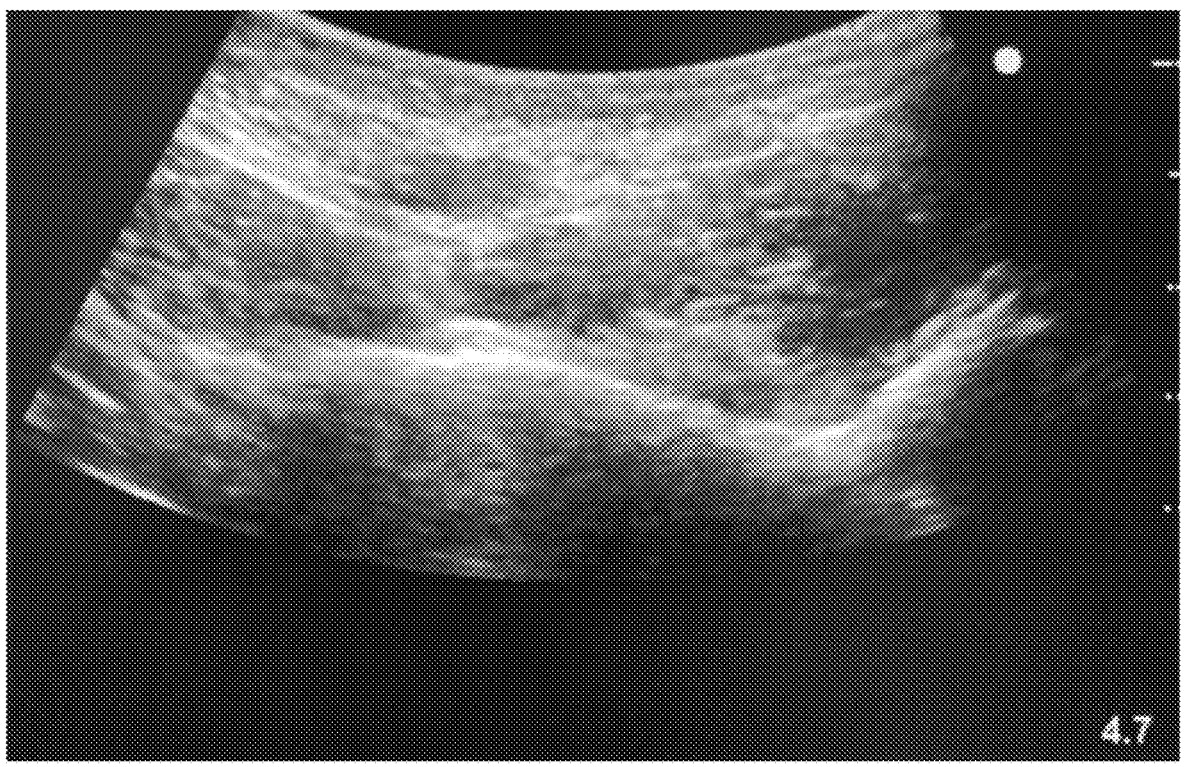
FIG. 4B, 4C describe an ultrasonic (4B) and annotated (4C) ultrasonic scan of the anatomical landmarks according to the invention.
Figure 4C:
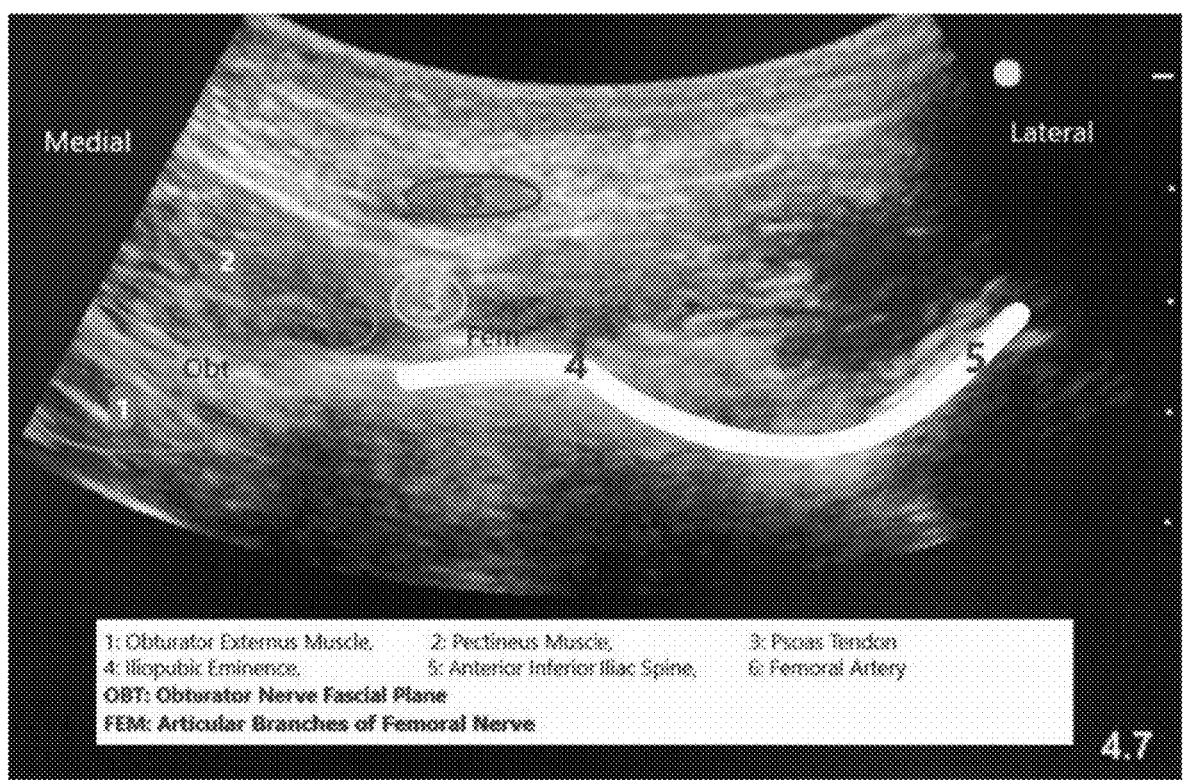

Typically, the single needle insertion point uses anatomical landmark for a SIP/SP needle entry that is higher and above femoral crease than a conventional femoral nerve block which is usually done lateral to femoral artery and below the femoral crease using the high frequency ultrasound probe. Moreover, the block as disclosed herein directly blocks the stem of obturator nerve, which also supplies the anterior capsule of hip joint, before it branches into anterior and posterior divisions; see upper two circles in FIG. 3.

This opioid free/sparing single block technique will be performed on a subject undergoing a total/hemi hip arthroplasty to avert many side effects of parental opioids and NSAID like nausea, vomiting, urine retention and respiratory depression which lead to a bad patient experience and prolong hospital stay. In contrast conventional surgical procedures, the patient will have an intense sensory nerve block without or with minimal motor weaknesses. The patient will also have a less painful postoperative experience, can commence physiotherapy earlier, benefit from an earlier rehabilitation and experience better post-operative psychological satisfaction. This single block technique makes hip surgery a part of much needed ERAS (Enhanced recovery after surgery) protocol which provides significant benefits to both the patient and hospital.

One aspect of this new technology is a kit comprising at least one curvilinear ultrasound probe, sterile packaging or tray of needles suitable for injection an anesthetic around the ON, or around the ON and AON, anesthetic medications suitable for producing a nerve block, syringes, antiseptic, surgical gloves, swabs and sterile gauze; example, a surgical kit may include a standard block tray, a10-mL syringe containing local anesthetic solution, a 10-cm, 21 to 22-gauge, short-bevel, insulated needle, sterile gloves, and, optionally, a peripheral nerve stimulator.

When using ultrasound guidance with nerve stimulation, the anterior and posterior branches of the obturator nerve are identified and stimulated to elicit a motor response prior to injecting local anesthetic solution around each branch. A syringe or other fluid source that is in fluid communication with a needle can be used to deliver the desired volume or other dosage of a nerve blocking medication such as a local anesthetic. The nerve block injections as disclosed herein utilize ultrasound guidance, which is accomplished by first placing an ultrasound transducer (probe) over the target nerve to be blocked. Once the nerve is visualized on the ultrasound display monitor, the anesthesiologist inserts a needle under the ultrasound probe and observes it on the screen. Holding the ultrasound probe in one hand and the needle in the other, the anesthesiologist guides the needle tip towards the target nerve. The needle is connected through tubing to a syringe. When the needle is adjacent to the target nerve, the syringe plunger is pulled back to confirm that the needle tip is not in a blood vessel, and then the plunger is pushed forward to deliver the nerve blocking agent to bathe the target nerve without injecting the agent directly into the nerve (intraneural injection).

The term "single needle entry point" refers to puncturing the skin only once as opposed to puncturing the skin at multiple sites to provide multiple independent injections. With a single needle entry point only one skin entry point is needed. Typically, the injection of local anesthetic at one or more internal target sites is accomplished without withdrawing the needle in distinction to withdrawing and re-puncturing the skin at the same general location or using multiple entry points to deliver local anesthetic to different internal target sites, the most commonly used conventional techniques involve multiple needle placements, one for each nerve blocked. A conventional multiple needle technique may require a large amount of local anesthetic for anesthetizing the skin, thereby increasing the rate of false-positive blocks. However, this is unnecessary for establishing a nerve block as disclosed herein. Initially, the needle is directed toward the SIP area where the femoral nerve targeted then after anesthetizing this nerve with local anesthetic, the same needle is withdrawn with the tip still in the subcutaneous tissue and redirected toward SP region to block the ON and AON (when present), while continuing to use only the antero-posterior view, thereby using only one entry site. The inventors have found that a single needle entry technique provides accuracy similar to the more conventional multiple needle approach but because only one skin entry point is needed this technique may afford several advantages over the multiple needle approach like less patient discomfort, less time required, and a smaller volume of local anesthetic.

Ultrasound probe. Medical ultrasonic transducers (probes) come in a variety of different shapes and sizes for use in making cross-sectional images of various parts of the body. The transducer is typically used in contact with the skin. An ultrasound-guided procedure may use a probe positioning system to hold the ultrasonic transducer. The inventors preferably employ a curvilinear probe which uses lower frequency ultrasound allowing a deep penetration and a wide depth of field, which is excellent for viewing anatomical structures in or around the ON and AON. An ultrasound probe is typically attached to an ultrasound machine and includes a sterile sleeve.

Embodiments of the invention include, but are not limited to the following.

A method for inducing a regional block comprising the articular branches of the femoral nerve (FN), the obturator nerve (ON), and the accessory obturator nerve (AON), in a subject, the method comprising: injecting an anesthetic via a single needle entry point into a region around the high articular femoral branch and then changing the angle and direction of the single needle to inject the anesthetic around the obturator nerve stem, under guidance of a curvilinear ultrasound probe which provides a view of the regions containing the nerves to be injected. In one embodiments of this method, the regional block simultaneously blocks the high femoral and obturator nerve stems prior to their branching into anterior and posterior branches. In other embodiments of this method the regional block blocks the nerve supply to the anterior capsule of the hip; the regional block blocks the articular branches of the femoral nerve and obturator nerve in one sonoanatomical frame with minimal or without requiring movement of the curvilinear probe; the regional block comprises combined sub-iliopsoas and sub-pectineal blocks; the regional block is higher and above femoral crease than a conventional femoral nerve block done lateral to femoral artery and below the femoral crease; the regional block directly blocks the stem of obturator nerve before it branches into anterior and posterior divisions; and/or the regional block only blocks the sensory articular branch of the femoral nerve.

In some embodiments of this method an amount of opiate or other parenteral analgesics administered for intraoperative or post-operative pain control is reduced compared to that administered after a conventional femoral nerve block done lateral to the femoral artery; and/or the subject experiences no or minimal motor blocks after the regional block is established.

In some embodiments of this method the regional block involves identification of anatomical landmarks and avoids a central neuraxial (spinal/epidural) block.

In other embodiments of this method the subject experiences substantially no/minimal dysfunction of the bladder after the regional block is established.

In some embodiments of this method the regional block is administered peri-operatively to a subject who has undergone a total hip arthroplasty; the regional block is administered peri-operatively to a subject who has undergone a partial hip arthroplasty; the regional block is administered to a subject who has a hip fracture; and/or the regional block is applied to relieve adductor muscle spasm associated with hemiplegia or paraplegia.

Another aspect of the invention is directed to a method of using a curvilinear ultrasound probe to image in one sonoanatomical frame a femoral nerve (FN), obturator nerve (ON) and accessory obturator nerve (AON) comprising placing the curvilinear ultrasound probe over an anatomical location of these nerves and, optionally, selecting a single entry point on the skin of a subject for injection of an anesthetic around the FN and ON, or around the FN, ON and AON.

A further aspect of the invention is directed to a kit comprising at least one curvilinear ultrasound probe, needle suitable for injection an anesthetic around a femoral nerve (FN) and obturator nerve (ON), or around the FN, ON and accessory obturator nerve (AON), a syringe, and an anesthetic suitable for producing a nerve block. In some embodiments, the kit further comprises at least one of a sterile packaging or tray for the needle, syringe and other kit components, antiseptic, surgical gloves, swabs, gauze, bandages, packaging materials for the kit, instructions for selecting a single entry point for the needle using the kit, and/or instructions for performing a single entry point injection of the anesthetic around the FN and ON, or around the FN, ON and AON to produce the nerve block. In one embodiment, the kit contains a single syringe and needle for injection of a LA. The kit may also contain no, or a reduced amount of, a opioid free or opioid sparing SIP/SP nerve block such as a LA, or a reduced amount of an analgesic, such as an opioid or opioid-like drug, compared that used during or after a conventional nerve block.

EXAMPLE

Innovation Technical Steps for Single Entry Nerve Block

After taking appropriate consent and giving general anesthesia, under full aseptic condition with utilization of low frequency ultrasound probe the obturator and femoral nerves block is performed at two locations (subiliopsoas and sub-pectineal) by depositing the required volume and dose of local anesthetic drug. It is important for the local anesthetic solution to spread into the interfacial space and not be injected into the muscles hence the pattern of drug spread and distribution will be observed during medication injection to confirm the accumulation and effectiveness of medications spread where Subiliopsoas will produce convex linear pattern of LA drug (Hypoechoic) spread and Sub-pectineal will give linear spread of LA drug in interfacial plane between pectineus muscle and External obturators muscle.

Terminology used herein is for the purpose of describing particular embodiments only and is not intended to be limiting of the invention.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all subranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for inducing a regional block of articular branches of a femoral nerve, an obturator nerve, and an accessory obturator nerve, in a subject, the method comprising:
    injecting an anesthetic via a single needle entry point into a region around a high articular femoral branch, and then
    changing an angle and a direction of a single needle to inject the anesthetic around an obturator nerve stem, under guidance of a low frequency curvilinear ultrasound probe which provides a view of regions containing nerves to be anesthetized.

2. The method of claim 1, wherein the regional block simultaneously blocks a high femoral nerve stem and the obturator nerve stem prior to their branching into anterior and posterior branches.

3. The method of claim 1, wherein the regional block blocks a nerve supply to an anterior capsule of a hip.

4. The method of claim 1, wherein the regional block blocks the articular branches of the femoral nerve and obturator nerve in one sonoanatomical frame with minimal or no movement of the low frequency curvilinear probe.

5. The method of claim 1, wherein the regional block comprises combined sub-iliopsoas and sub-pectineal blocks.

6. The method of claim 1, wherein the regional block is higher and above a femoral crease than a conventional femoral nerve block done lateral to a femoral artery and below the femoral crease.

7. The method of claim 1, wherein the regional block directly blocks a stem of the obturator nerve before it branches into an anterior division and a posterior division.

8. The method of claim 1, wherein the regional block only blocks a sensory articular branch of the femoral nerve.

9. The method of claim 1, wherein an amount of an opiate or other parenteral analgesics administered for an intraoperative or post-operative pain control is reduced compared to that administered after a conventional femoral nerve block done lateral to the femoral artery.

10. The method of claim 1, wherein the subject experiences no or minimal motor blocks after the regional block is established.

11. The method of claim 1, wherein the regional block involves identification of anatomical landmarks and avoids a central neuraxial (spinal/epidural) block.

12. The method of claim 1, wherein the subject experiences substantially no/minimal dysfunction of a bladder after the regional block is established.

13. The method of claim 1, wherein the regional block is administered peri-operatively to the subject who has undergone a total hip arthroplasty.

14. The method of claim 1, wherein the regional block is administered peri-operatively to the subject who has undergone a partial hip arthroplasty.

15. The method of claim 1, wherein the regional block is administered to the subject who has a hip fracture.

16. The method of claim 1, wherein the regional block is applied to relieve an adductor muscle spasm associated with a hemiplegia or a paraplegia.

17. The method of claim 1, wherein
the nerve block is performed at two locations, a subiliopsoas and a subpectineal,
and wherein the anesthetic is not injected into the muscles but spreads into an interfacial space, such that a subiliopsoas injection produces a hypoechoic convex linear pattern of drug spread, and a subpectineal injection produces a linear spread of the anesthetic between a pectineus muscle and an external obturators muscle.

* * * * *